Patented Aug. 2, 1938

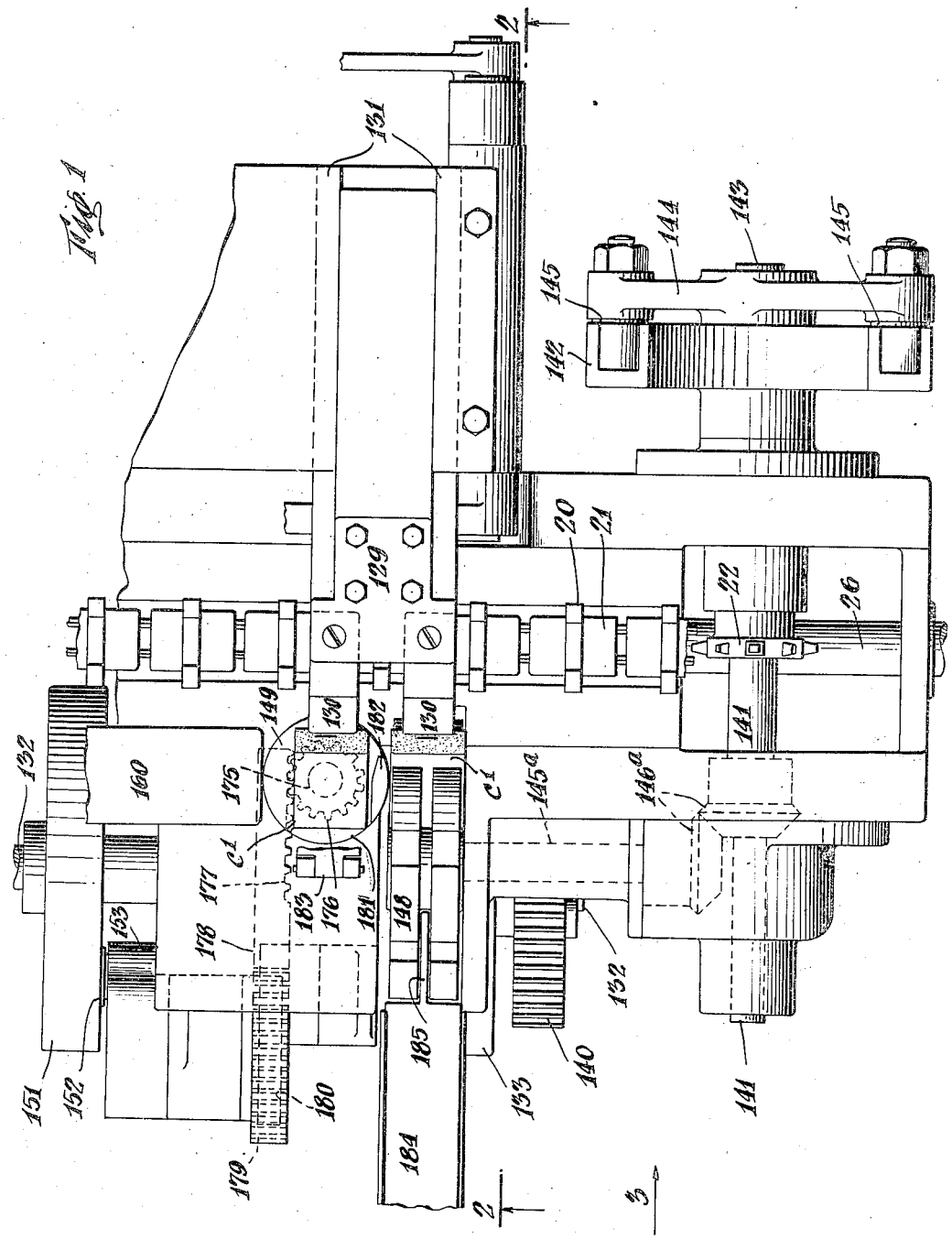

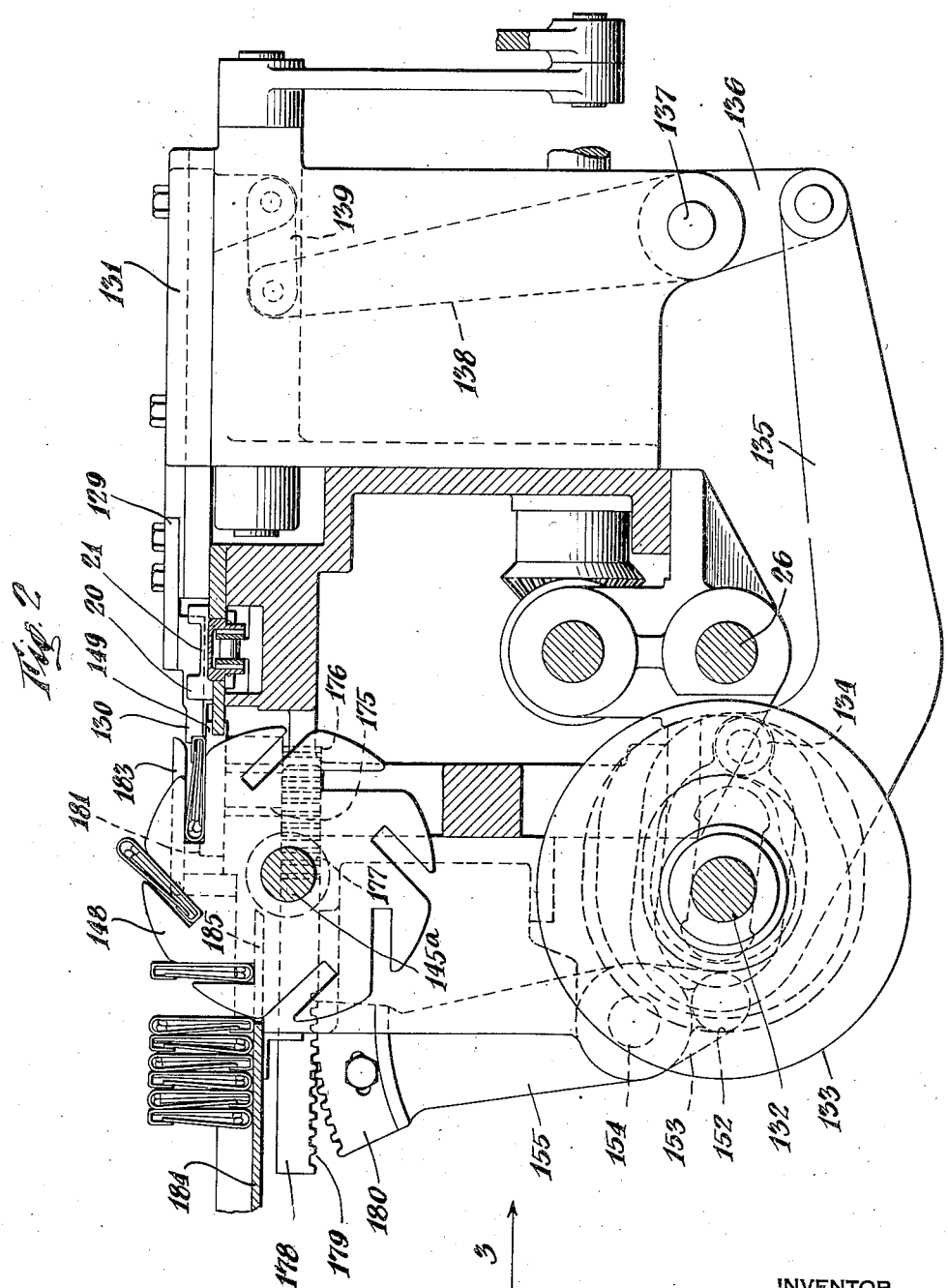

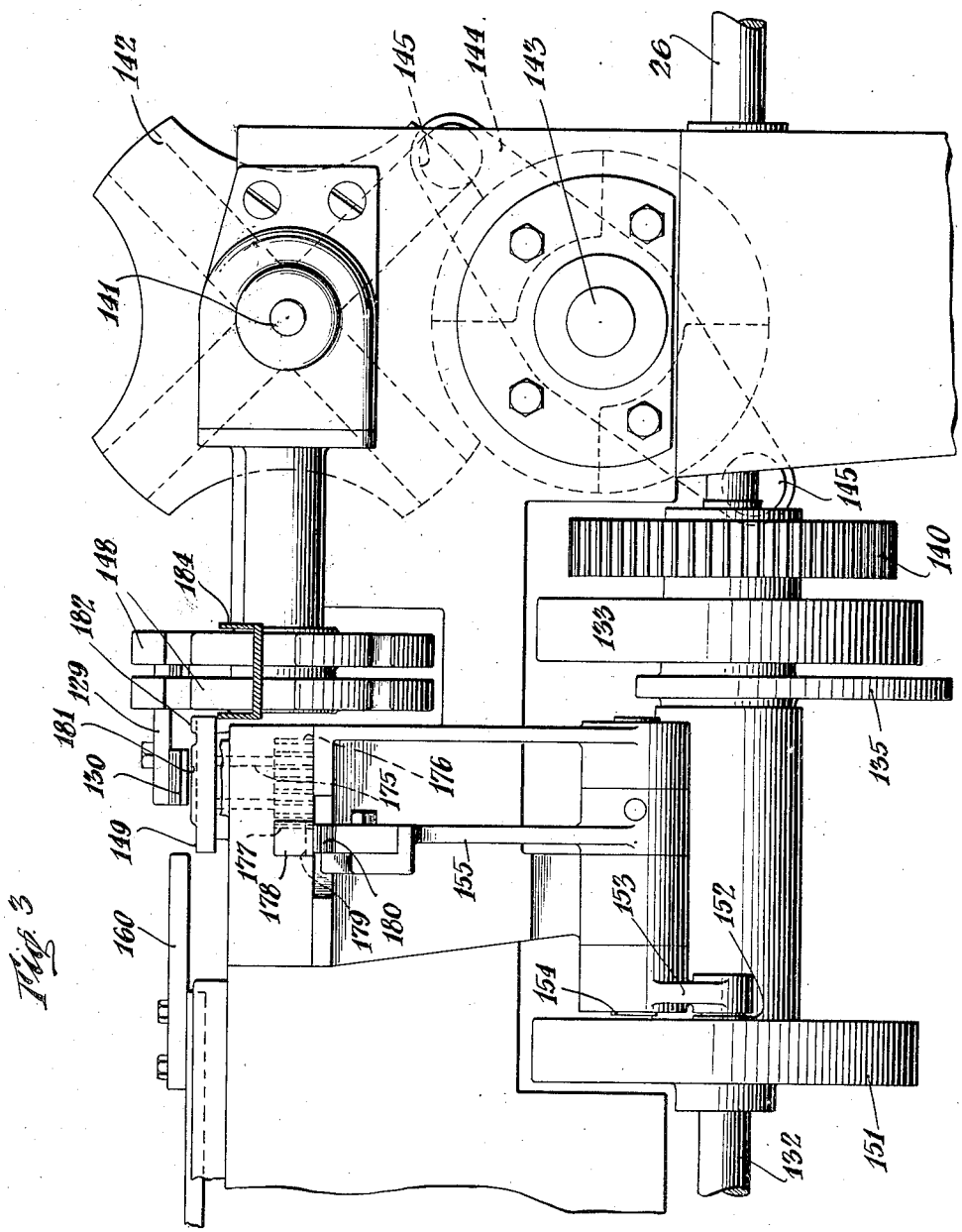

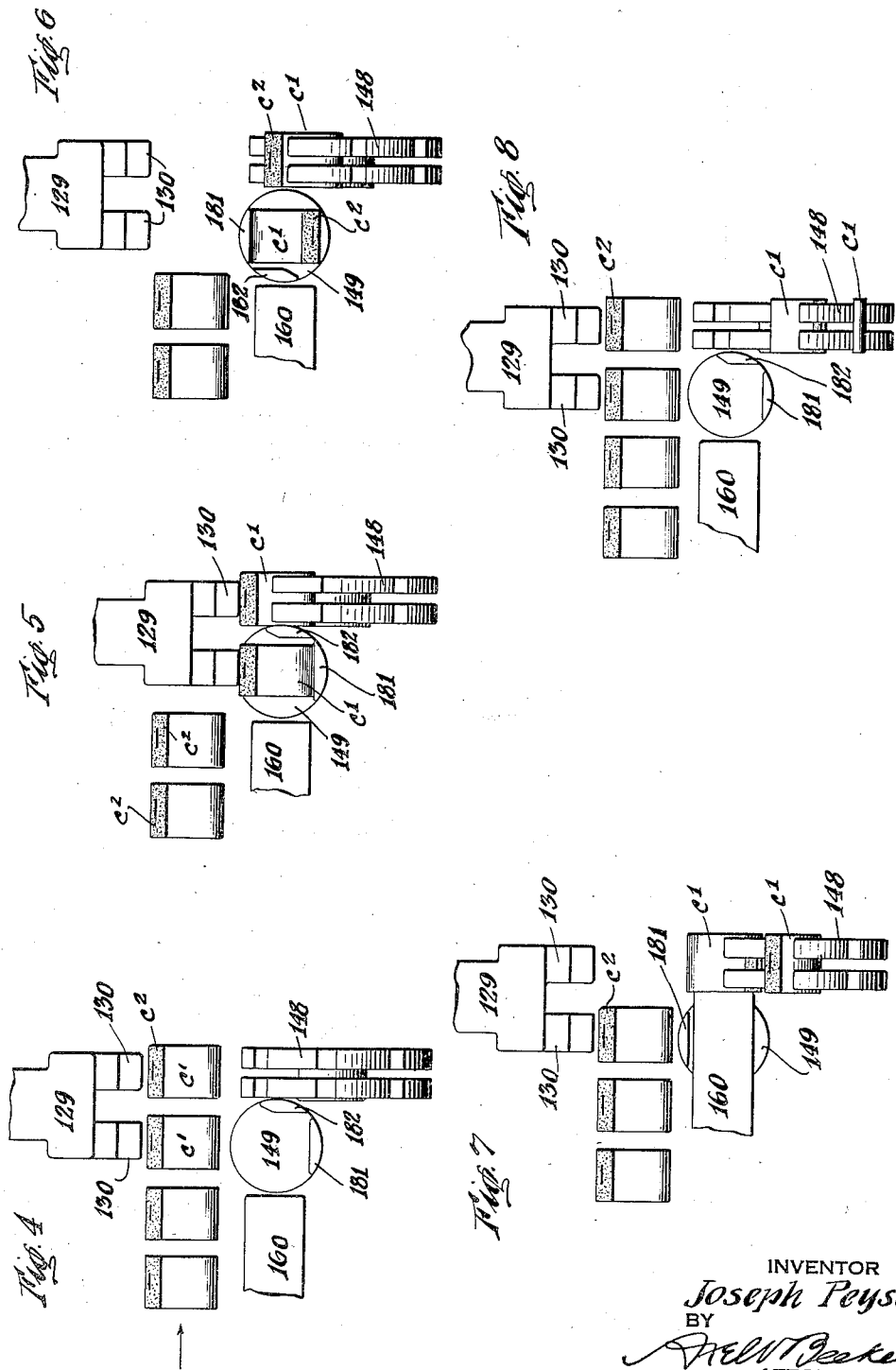

2,125,357

UNITED STATES PATENT OFFICE 2,125,357

METHOD OF AND MEANS FOR ASSEMBLING ARTICLES

Joseph Peyser, Mount Vernon, N. Y.

Application December 10, 1936, Serial No. 115,088

7 Claims. (Cl. 226—4)

This invention relates to methods of and means for assembling match-books and similar articles in series, and has for its main object the provision of a simple and efficient arrangement for placing such articles in sequence with alternate articles in reversed position endwise but without reversing them facewise.

In the accompanying drawings, the invention is shown in a concrete and preferred form in which Fig. 1 is a top plan view of the delivery end of a match-book-making machine such as is disclosed in my applications Ser. Nos. 11,269 and 48,281 filed respectively on March 15, 1935 and November 5, 1935, but showing my improved mechanism and method.

Fig. 2 is a transverse sectional view substantially on the plane of line 2—2 of Fig. 1;

Fig. 3 is a view mostly in elevation but partly in section looking in the direction of arrow 3 in Figs. 1 and 2; and Figs. 4 to 8 inclusive are diagrammatic views showing the steps of the method employed.

In the applications aforementioned, two match-books are simultaneously ejected from the machine, after which one of said books is reversed endwise and brought into line with the other, so that the match-books are stacked one with its thick end in one direction and the next one with its thick end in the other direction and so on in alternation. This makes very compact stacking possible, but it has the disadvantage that the match-book which is reversed end to end is also reversed facewise with the result that any given match-book of a series always has its smooth face adjacent the smooth face of another match-book at one side, and its irregular face, where the cover overlaps itself, adjacent an irregular face of the match-book at its other side. If such a stack of match-books, therefore, is placed in an automatic vending machine, difficulty is experienced in separating the match-books because the irregular faces are apt to interlock in sliding past each other. The main object and feature of this invention is to overcome this difficulty, and to this end a method and means are employed to reverse the match-book end to end while retaining the same face up so that in stacking the books a smooth and an irregular face always come opposite and two irregular faces never come adjacent each other.

The invention can most easily be understood by considering Figs. 4 to 8 which show the several steps of the method. C1 indicates a succession of match-books advancing step by step in the direction indicated by the arrow in Fig. 4. 129 is a match-book-ejecting device having two ejecting members 130 to simultaneously eject two match-books. 148 is a delivery member rotating on a horizontal axis and 149 is a reversing member that turns on a vertical axis. 160 is a transfer device that moves a match-book from reversing member 149 to delivery member 148. When two match-books C1 come to rest in the position indicated in Fig. 4, ejecting device 129 advances, as shown in Fig. 5, and moves one match-book directly to delivery device 148 and places another on reversing member 149. As shown in the drawings, the match-books are delivered with the same face up and with the thick ends extending in the same direction. The thick end is the one which is opposite to striking plate C2. As shown in Fig. 6, the ejecting device now withdraws and delivery member 148 turns one step while at the same time reversing member 149 is given a half turn thus reversing the match-book carried by it endwise but without reversing it facewise. As shown in Fig. 7, transfer member 160 now advances and moves the match-book from reversing member 149 to delivery member 148. As shown in Fig. 8, transfer member 160 is now retracted and delivery member 148 takes another step. The result of stacking the match-books is clearly shown in Fig. 2.

The general construction of the match-book machine is, in this instance, similar to that disclosed in the aforementioned applications, and is specifically here as follows: 20 indicates a conveyer here in the form of an intermittently movable sprocket chain having blank or cover supporting compartments or surfaces 21, said chain being trained over driving sprocket 22 and over another sprocket (not shown) at the other end of the machine. Arranged alongside this conveyer are the various instrumentalities or mechanisms for associating cover blanks and match-combs which it is unnecessary to describe in this application. Extending longitudinally through the machine is main shaft 26 that here makes one revolution to each cycle of the machine, i. e. to each match-book produced. Match-book-ejecting device 129 is in the form of a slide moving in guides 131. This slide receives its motion from shaft 132 carrying a cam 133 with which engages a cam roller 134 mounted on arm 135 pivotally connected by arm 136 to rock-shaft 137, from which latter extends an arm 138 pivotally connected by means of link 139 to slide 129. Shaft 132 makes one revolution to each two revolutions of main shaft 26 and is driven from the latter by means of a spur gear meshing with gear 140 on said shaft 132.

Conveyer 20 is advanced intermittently one step to each revolution of the main shaft by any suitable means such as the following: sprocket 22 is secured to shaft 141 to which latter is also secured slotted member 142 of a Geneva stop motion device. Mounted on shaft 143 is a two-armed member 144 carrying rollers 145 to engage with the slots in member 142. Shaft 143 makes one revolution to each two revolutions of main shaft 26 but inasmuch as shaft 143 carries two arms 144, it will be seen that shaft 141, and hence sprocket 22 and conveyer 20, makes two steps to each revolution of shaft 143 and one step to each revolution of main shaft 26.

Shaft 141 drives shaft 145a by means of bevel gears 146a, and mounted on shaft 145a is the rotatable delivery member 148, which latter is thus moved a step to deliver a match-book every time conveyer 20 takes a step. Reversing member 149 is mounted on a vertical shaft 175 that carries a pinion 176 with which meshes one face 177 of a reciprocating rack 178, the other face 179 of which is actuated by a gear sector 180. Gear sector 180 is carried by an arm 155 mounted on rockshaft 154 that carries an arm 153 provided with a cam roller 152 engaging cam 151 on shaft 132. Reversing member 149 is rotated one-half of a revolution in either direction once to each two steps of delivery member 148. Reversing member 149 is provided with a front gage 181 and with a side gage 182 which lie below the plane of movement of transfer member 160 as shown in Fig. 3. Mounted independently of reversing member 149 and on the framework is a pivotally supported hold-down member 183 beneath which the match-book is pushed. Member 160 is reciprocated from a suitable cam at the other end of the machine. Delivery member 148 consists of two slotted elements spaced apart and delivers the match-books to a trough 184 which is provided with an extension 185 that projects in between the slotted elements of delivery member 148 so as to prevent the match-books from being carried past the trough.

From the foregoing it will be seen that two match-books are delivered simultaneously, one to reversing member 149 and the other to delivery member 148, with the same ends extending in the same direction. At this time side gage 182 is located adjacent to the delivery member. Side gage 182 is of a height less than the thickness of the match-book and, when reversing member 149 turns, said side gage engages the edge of the lower part of the match-book to cause the latter to turn with the reversing member. The reversing member makes a half turn and the side gage now occupies a position adjacent transfer device 160. The transfer device is located in a plane above and passes over side gage 182 and engages the upper part of the match-book thereby transferring it to delivery member 148. The delivery member advances a step after the receipt of each match-book and stacks them in the manner previously described.

I claim:

1. The method of feeding a plurality of articles with opposite ends of alternate articles extending in a given direction, which consists in: delivering two such articles side by side with the same face up and with the same ends extending in the same direction, and then reversing the position of one of said articles endwise while retaining the same face up and bringing it in line with the other article.

2. The method of feeding a plurality of articles, one end of which is thicker than the other, with the thick and thin ends of alternate articles extending in a given direction, which consists in: delivering two such articles side by side with the same face up and with the thick ends extending in the same direction, and then reversing the position of one of said articles endwise while retaining the same face up and bringing it in line with the other article.

3. The method of delivering match-books from a machine for producing them, which consists in: simultaneously delivering two match-books side by side with the same face up and with the thick end extending in the same direction, and then reversing the position of one of said books endwise while retaining the same face up and bringing it in line with the other book.

4. In a match-book machine, a delivery member rotatable on a horizontal axis; a reversing member, alongside of the delivery member, mounted on a vertical axis; means to simultaneously deliver two match-books flatwise and side by side from said machine, one to the delivery member and the other to the reversing member; means to reverse the position of the reversing member on its vertical axis; and a transfer device to deliver the reversed match-book from the reversing member to the delivery member.

5. In a match-book machine, a reversing member rotatable in a horizontal plane; means to deliver a match-book flatwise to said reversing member; a side gage on said reversing member of a height less than the thickness of the match-book to engage the edge of the lower part of said match-book to thereby turn it with the reversing member when the latter is rotated; and a transfer member located in a plane above and to pass over said gage to engage the edge of the upper part of the match-book to remove the match-book from the reversing member.

6. In a match-book machine, a reversing member rotatable in a horizontal plane; means to deliver a match-book flatwise to said reversing member; a side gage on said reversing member of a height less than the thickness of the match-book to engage the edge of the lower part of said match-book to thereby turn it with the reversing member when the latter is rotated; a transfer member located in a plane above and to pass over said gage to engage the edge of the upper part of the match-book to remove the match-book from the reversing member; and means to receive the match-book from the transfer member and to stack it in an upright position.

7. In a match-book machine, a delivery member rotatable in a vertical plane; a trough to receive match-books therefrom in an upright position; a reversing member rotatable in a horizontal plane and located adjacent the delivery member; means to simultaneously deliver two match-books flatwise and with the same ends extending in the same direction, one to the delivery member and one to the reversing member; a side gage on said reversing member of less height than the thickness of the match-book, located adjacent the delivery member when the match-books are received by the delivery member and transfer member, to engage the edge of the lower part of said match-book to thereby turn it with the reversing member when the latter is rotated; and a transfer member located in a plane above and to pass over said gage to engage the edge of the upper part of the match-book to transfer it to the delivery member.

JOSEPH PEYSER.